(12) United States Patent
Chan et al.

(10) Patent No.: US 10,217,002 B2
(45) Date of Patent: Feb. 26, 2019

(54) SYSTEMS AND METHODS FOR MONITORING UNMANNED VEHICLES

(71) Applicant: International Business Machines Corporation, Armonk, NY (US)

(72) Inventors: Yuk L. Chan, Rochester, NY (US); Kyle E. Gilberston, Rochester, MN (US); Daniel F. Hogerty, Green Brook, NJ (US); Eileen P. Tedesco, Sharon, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 15/228,399

(22) Filed: Aug. 4, 2016

(65) Prior Publication Data

US 2018/0039838 A1 Feb. 8, 2018

(51) Int. Cl.
| | |
|---|---|
| G06K 9/00 | (2006.01) |
| G08G 5/00 | (2006.01) |
| B64C 39/02 | (2006.01) |
| G06T 7/70 | (2017.01) |
| G08G 1/017 | (2006.01) |
| G08G 1/04 | (2006.01) |
| G08G 1/00 | (2006.01) |
| G06F 17/30 | (2006.01) |

(52) U.S. Cl.
CPC .......... *G06K 9/00771* (2013.01); *B64C 39/02* (2013.01); *G06K 9/00664* (2013.01); *G06T 7/70* (2017.01); *G08G 1/0175* (2013.01); *G08G 1/04* (2013.01); *G08G 1/205* (2013.01); *G08G 5/0043* (2013.01); *B64C 2201/00* (2013.01); *G06F 17/30283* (2013.01); *G06K 2209/23* (2013.01); *G06K 2209/27* (2013.01); *G06T 2207/30232* (2013.01); *G06T 2207/30241* (2013.01); *G06T 2207/30248* (2013.01)

(58) Field of Classification Search
CPC combination set(s) only.
See application file for complete search history.

(56) References Cited

U.S. PATENT DOCUMENTS

| 8,890,717 | B2 | 11/2014 | McClellan et al. | |
|---|---|---|---|---|
| 2007/0081723 | A1* | 4/2007 | Aboutalib | G06K 9/00201 382/170 |

(Continued)

OTHER PUBLICATIONS

Chalfant, Morgan:The Washington Free Beacon, [online]; [retrieved on Jun. 14, 2016]; retrieved from the Internet http://freebeacon.com/issues/faa-regulation-will-hinder-u-s-clout-in-eventual-14b-drone-industry-report-says/, Report: FAA Regulation Will Hinder US Clout in Eventual $14B Drone Industry, Sep. 11, 2015; 15 pages.

FlightAware, [online]; [retrieved on Jun. 14, 2016]; retrieved from the Internet https://flightaware.com/about/faq"Flight Aware Frequently Asked Questions," 6 pages.

(Continued)

*Primary Examiner* — Alex Kok S Liew
(74) *Attorney, Agent, or Firm* — Cantor Colburn LLP; William A. Kinnaman, Jr.

(57) ABSTRACT

Aspects relate to methods, systems, and devices for monitoring unmanned vehicles. Methods include receiving, by a processor, a captured image of an observed unmanned vehicle, the captured image including measured data, comparing the measured data with an unmanned vehicle database, determining a status of the observed unmanned vehicle, and generating an indicator regarding the status of the observed unmanned vehicle.

14 Claims, 5 Drawing Sheets

(56) References Cited

U.S. PATENT DOCUMENTS

| | | | |
|---|---|---|---|
| 2007/0293996 A1* | 12/2007 | Mori | G01C 21/005 |
| | | | 701/23 |
| 2009/0087029 A1* | 4/2009 | Coleman | G06K 9/00208 |
| | | | 382/103 |
| 2015/0242972 A1 | 8/2015 | Lemmey et al. | |
| 2015/0346722 A1 | 12/2015 | Herz et al. | |
| 2016/0078299 A1* | 3/2016 | Nerayoff | H04N 7/181 |
| | | | 705/13 |

OTHER PUBLICATIONS

Hayhurst, et al. "A case study for assured containment"; Unmanned Aircraft Systems (ICUAS), 2015 International Conference on. IEEE, 2015; pp. 261-269.

Humphreys, "Statement on the Security Threat Posed by Unmanned Aerial Systems and Possible Countermeasures." The University of Texas at Austin, (2015); 9 pages.

Luxhoj, "System Safety Modeling of Alternative Geofencing Configurations for small UAS." International Journal of Aviation, Aeronautics, and Aerospace vol. 3 Issue 1, Article 2, Feb. 16, 2016; 27 pages.

RTL-SDR, [online]; [retrieved on Jun. 14, 2016]; retrieved from the Internet http://www.rtl-sdr.com/adsb-aircraft-radar-with-rtl-sdr/ "RTL-SDR Tutorial: Cheap ADS-B Aircraft Radar", rtl-sdr.com, Apr. 13, 2013; 17 pages.

Song et al. "Persistent UAV service: an improved scheduling formulation and prototypes of system components." Journal of Intelligent & Robotic Systems 74.1-2 (2014): pp. 221-232.

\* cited by examiner

SYSTEMS AND METHODS FOR MONITORING UNMANNED VEHICLES

BACKGROUND

The present disclosure relates generally to drones and other unmanned vehicles and, more specifically, to systems and methods for monitoring unmanned vehicles.

As drones and other unmanned vehicles (e.g., aircraft, rovers, etc.) become more prominent in the market, policing, monitoring, and controlling of such devices becomes an important task. Many of these aspects can be taken care of through proper routing requirements together with simple monitoring mechanism.

SUMMARY

According to embodiments, a method, system, and computer program product are provided for monitoring unmanned vehicles. Methods include receiving, by a processor, a captured image of an observed unmanned vehicle, the captured image including measured data, comparing the measured data with an unmanned vehicle database, determining a status of the observed unmanned vehicle, and generating an indicator regarding the status of the observed unmanned vehicle.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are directed to systems and methods for policing, monitoring, and reporting drones and other unmanned vehicles (e.g., aircraft, rovers, etc.). Various embodiments provided herein are directed to systems and methods to verify an unmanned vehicle's location and identify and, in some embodiments, identify illegal unmanned vehicle that are present in a particular area or airspace. Embodiments of the present disclosure can be employed by citizens and/or law enforcement without the use of specialized equipment. For example, various embodiments of the present disclosure can be employed on or with various consumer, personal, or portable electronic devices, including, but not limited to smartphones, wearable technologies (e.g., watches, glasses, etc.), tablets, laptops, etc.

In some embodiments, based on periodic reports regarding the location and an optionally prescribed route, systems provided herein can project a current location of an unmanned vehicle. Various embodiments provided herein are configured to create an argument reality view of the current sky or area with a projected location of an unmanned vehicle. In accordance with some embodiments, with a known location of an unmanned vehicle (e.g., real-world data/information) and a known projected location (e.g., routing information for specific unmanned vehicle), a determination can be made regarding an unmanned vehicle that may be missing or illegal (e.g., a status of the unmanned vehicle). Further, the augmented reality view can be used to show a user the location where an unmanned aircraft is intended or supposed to be. Additionally, embodiments provided herein are directed to capturing evidence of an illegal, improperly located, etc. unmanned vehicle. Further, reporting such illegal or improper unmanned vehicle to proper authorities, enforcement agencies, and/or property owners is enabled.

Figure 1:
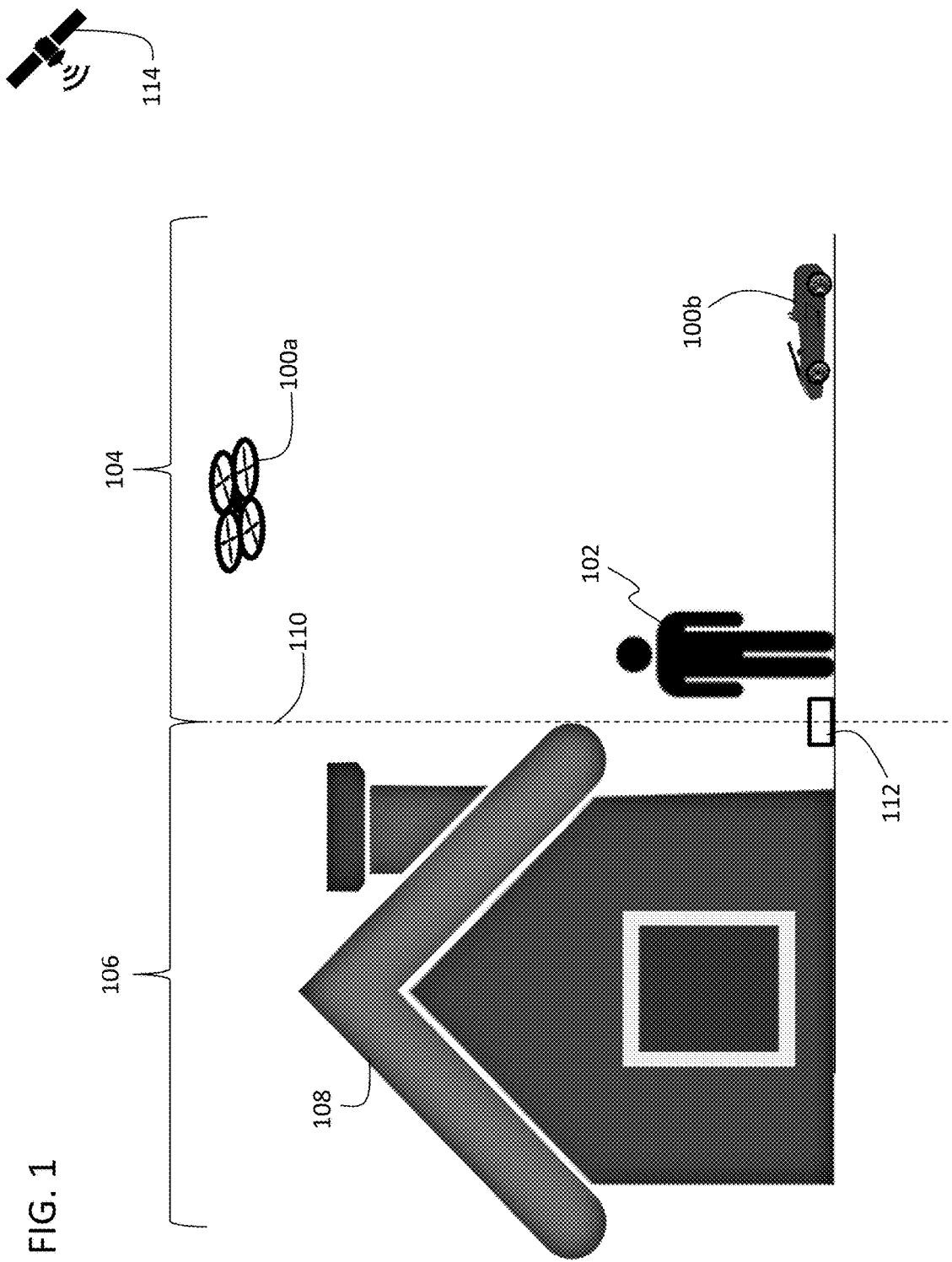
FIG. 1 is a schematic illustration of unmanned vehicles in accordance with an embodiment.

Turning to FIG. 1, a schematic illustration showing multiple unmanned vehicles 100a, 100b in a setting. The unmanned vehicles 100a, 100b can be observed by a user 102 that uses systems as described herein. As shown, a first unmanned vehicle 100a is an unmanned flying vehicle or aircraft and a second unmanned vehicle 100b is an unmanned ground vehicle or rover. The unmanned vehicles 100a, 100b of FIG. 1 are merely illustrative and those of skill in the art will appreciate that other types of unmanned vehicles can be tracked or otherwise be part of embodiments of the present disclosure.

Illustrated in FIG. 1 are two zones that will be discussed herein. A first zone 104, in some embodiments, is a permitted zone that is designated as acceptable for unmanned vehicles to operate and travel within. The first zone 104 can include active routes, public air space, public roads and paths, etc. that are designated for the use by the unmanned vehicles 100a, 100b and/or other unmanned vehicles. A second zone 106 is shown as a forbidden zone. The second zone 106 can include areas that are designated as improper, illegal, or otherwise unauthorized for use by unmanned vehicles. Such forbidden zones can include certain residential areas, airports, hospitals, sporting arenas and/or events, open airspace, military or other government or official sites, etc. As shown, the second zone 106 can include one or more structures 108 (shown illustratively as a house, but not limited thereto).

The first zone 104 and the second zone 106 are separated by a boundary 110. The boundary 110 may be a physical, tangible boundary such as a wall, street, river, etc. or may be an intangible boundary such as a property line, town or municipal line, designated flight corridor, specific distances from certain tangible structures or areas (e.g., proximity to power lines, proximity to airports, etc.), or other intangible boundary. The boundary 110 can be indicated by landmarks, structures, etc. or can be digitally monitored and maintained. IN some embodiments, the boundary 110 can be defined by one or more boundary indicators 112 (e.g., geo-fence devices, routers, beacons, etc.) and/or by position indicators 114 (e.g., GPS satellites, radar, etc.). In some configurations, the boundary indicators 112 can broadcast information or data such that if an unmanned vehicle 100a, 100b nears the boundary indicator 112, the unmanned vehicle 100a, 100b will receive information that it is at or near the second (unauthorized) zone 106. Further, in some configurations, the position indicators 114 can supply position information to the unmanned vehicle 100a, 100b such that based on the position information, the unmanned vehicle 100a, 100b can "know" where it is located relative to second (unauthorized) zones 106.

At times, the user 102 may desire to know if an unmanned vehicle 100a, 100b is supposed to be where the user 102 sees the unmanned vehicle 100a, 100b. That is, the user 102 may observe an unmanned vehicle 100a, 100b and wish to know if the unmanned vehicle 100a, 100b is where it belongs, or may wish to determine if the unmanned vehicle 100a, 100b is in an authorized or unauthorized zone. Alternatively, the user 102 may be waiting for or otherwise expect to see an unmanned vehicle 100a, 100b but doesn't actually see the unmanned vehicle 100a, 100b where it is expected to be. Accordingly, embodiments provided herein are directed to devices, systems, and methods for monitoring unmanned vehicles, determining if an unmanned vehicle is not where it should be, and reporting unmanned vehicles that are located in zones or places the unmanned vehicles should not be located.

Figure 2:
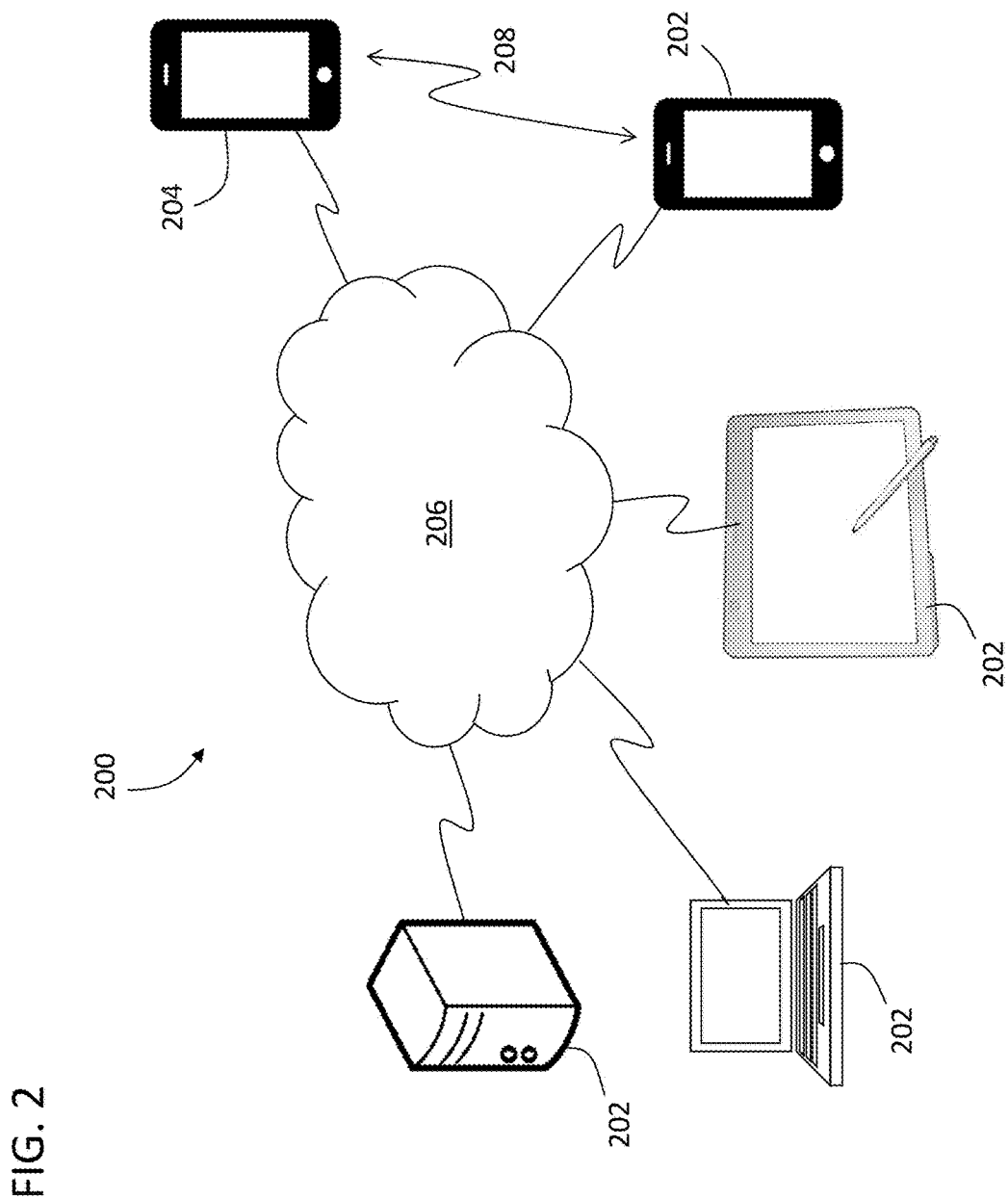
FIG. 2 depicts a block diagram of a system for enabling touchscreen electronic device functionality in accordance with an embodiment.

Referring now to FIG. 2, a block diagram of a system 200 for using an image capture device pertaining to a discussion in accordance with an embodiment is shown. The system 200 includes an image capture device 204 for performing the image capture (single image, multiple images, or video), processing, and/or enabling the functions and functionality described herein. For example, the image capture device 204 can be a smart phone, a digital camera, personal tablet, laptop computer, or other personal electronic device that includes image capturing software and hardware and/or data processing and transmitting software and hardware. In some embodiments, the image capture device 204 can be a security camera, traffic camera, or other mounted camera.

The image capture device 204 can be configured to execute one or more computer programs located on the image capture device 204 and/or located on one or more remote resources 202 through communication therewith. As shown and depicted, the image capture device 204 is a smartphone, although other personal or portable electronic devices or camera may employ embodiments described herein. As shown, the system 200 incorporates one or more remote resources 202, such as a laptop, a smartphone, a tablet, and/or a remote server or storage device (e.g., cloud-based storage) although other remote resources such as personal electronic devices or internet based sources may be used with systems and processes described herein.

The system 200 depicted in FIG. 2 includes one or more remote resources 202 which a user (e.g., user 102 of FIG. 1) can communicate with from the image capture device 204 to initiate, interact with, and/or receive information therefrom. In some embodiments, the image capture device 204 can automatically access the remote resources 202 during processing and operation as described herein. As shown, the remote resources 202 are coupled to the image capture device 204 via a network 206. Some of the remote resources 202 may be implemented using general-purpose computers executing computer programs for carrying out various processes and/or programs. The devices of the remote resources 202 may be user devices such as personal computers (e.g., laptops, tablet computers, cellular telephones, etc.). In some embodiments, such as if the remote resources 202 are personal computers or smartphones, the processing described herein may be shared by one or more remote resources 202 and/or the image capture device 204. The remote resources 202 may also include game consoles, network management devices, field programmable gate arrays, etc.

The network 206 may be any type of known network including, but not limited to, a wide area network (WAN), a local area network (LAN), a global network (e.g. Internet), a virtual private network (VPN), a cloud network, and an intranet. The network 206 may be implemented using a wireless network or any kind of physical network implementation known in the art. Various remote resources 202 can be coupled to or in communication with the image capture device 204 through one or more networks 206 (e.g., cellular, Internet, etc.) so that not all remote resources 202 are coupled to the image capture device 204 through the same aspect or type of network 206. One or more of the remote resources 202 and the image capture device 204 can be connected to the network 206 in a wireless fashion. In one non-limiting embodiment, the network is the Internet and one or more remote resources 202 and/or the image capture device 204 execute a user interface application (e.g. a web browser or app) to communicate to each other through the network 206.

In another non-limiting example embodiment, the remote resource 202 may be connected directly (i.e., not through the network 206) to the image capture device 204. That is, as shown, a direct or dedicated communication link 208 may be formed between the image capture device 204 and the remote resource 202 (e.g., a smartphone). Such connection may be made by Bluetooth® connection or other near-field communication protocol.

In some embodiments, the image capture device 204 may be configured to access one or more programs, applications, and/or software that are accessible in the cloud, e.g., stored on one or more internet based servers. As such, a storage device or remote server may be implemented as one of the remote resources 202 using a variety of devices for storing electronic information. In an example embodiment, data stored in the storage device or remote server may include, but is not limited to, unmanned vehicle databases, scheduled flight or travel plans (e.g., routing information), etc., and other data related to unmanned vehicles and/or utilized by embodiments described herein. It is understood that the remote server or storage device may be implemented using memory contained on a remote resource 202 or that it may be a separate physical device, e.g., an internet server with cloud storage or servers/databanks. The storage device remote resource 202 may be logically addressable as a consolidated data source across a distributed environment that includes the network 206. Information stored in the storage device may be retrieved and manipulated via the image capture device 204 and/or via another remote resource 202, e.g. a laptop or smartphone.

The image capture device 204 may be based on a modular concept designed to include a motherboard or base card of minimum card size that may be configured for enabling various functions. For example, a base card of the image capture device 204 may be implemented in a basic shell providing desktop-like functionality via a touchscreen display, a communications interface (e.g., GPS and cellular communications capability), or other features that may be provided within the base card. The image capture device 204 may be provided with a processor or controller, memory, and various other electronic components configured to enable image capture, feedback actions, processing, etc. on the image capture device 204 to enable a user to interact with programs and applications stored on the image capture device 204 and/or to communicate and interact with one or more programs and applications stored on the one or more remote resources 202.

The image capture device 204, in some embodiments, may execute one or more computer programs, e.g., an image capture application, to provide aspects of embodiments as described herein. Processing may be shared by the image capture device 204 and one or more of the remote resources 202. Alternatively, the image capture device 204 can include stand-alone software application(s) for performing a portion or all of the processing described herein. As previously described, it is understood that separate servers may be utilized to implement network server functions and application server functions. Alternatively, a network server, a firewall, and an application server may be implemented by a single server executing computer programs to perform the requisite functions.

In accordance with embodiments described herein, a user may use an image capture device 204 to capture an image of an area (e.g., a location where an unmanned vehicle is observed or a location where an unmanned vehicle is expected to be). As used herein the term "image" includes a single image, multiple images, or video, and is not limited only to a single image. That is, those of skill in the art will appreciate that a video is a continuous image capture and the video is formed of a continuous series of frames (e.g., images). Further, the image capture device 204 can be configured to communicate with a remote resource 202 to obtain information (e.g., flight plans/routes for an unmanned vehicle) and/or to transmit data related to the captured image, as described herein. The captured image can be a single frame or image, multiple different frames or images, continues frames, a video, or other image format, as known in the art.

Figure 3:
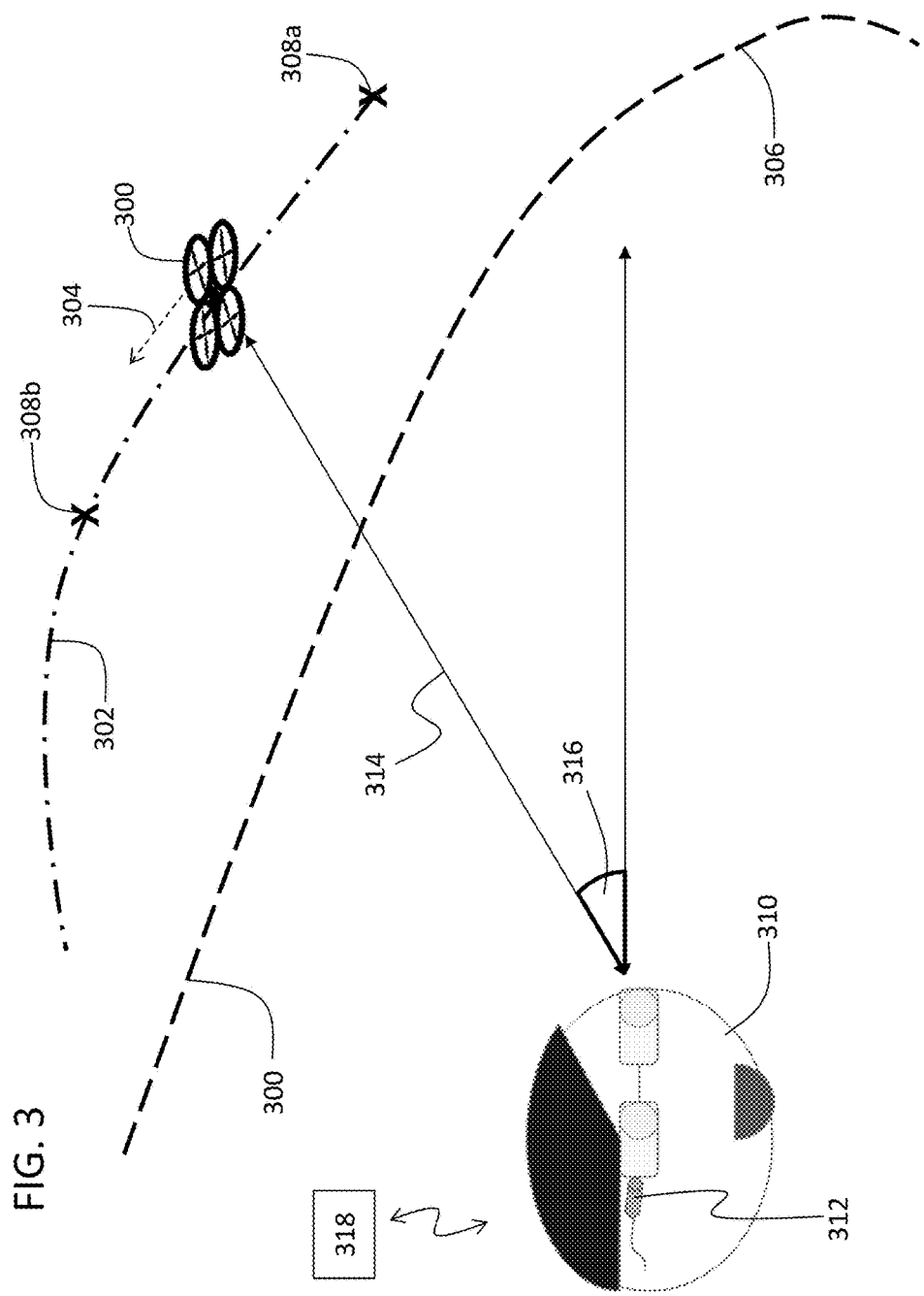
FIG. 3 is a schematic illustration of an embodiment illustrating a user relative to an observed unmanned vehicle.

Turning now to FIG. 3, a schematic illustration of an embodiment of the present disclosure is shown. In FIG. 3, an unmanned vehicle 300 is illustrated flying along a prescribed route 302 in a direction 304 (dashed arrow). As shown, the prescribed route 302 is indicated as outside of a boundary 306, such as a geo-fence boundary. In flight, the unmanned vehicle 300 is configured to periodically report the position and/or location of the unmanned vehicle 300. As indicated by the "X" designations along the prescribed route 302, the unmanned vehicle 300 will make location reports 308a, 308b (collectively location reports 308). In the illustration of FIG. 3, a last reported location report 308a is indicated at a position behind the unmanned vehicle 300 along the prescribed route 302. Further, a next reported location report 308b is indicated at a position ahead of the unmanned vehicle 300 along the prescribed route 302 (i.e., indication of the next time the unmanned vehicle 300 will report its location).

A user 310, such as an observer who sees the unmanned vehicle 300, is shown in FIG. 3. As illustrated, the user 310 has an image capture device 312 (illustratively shown as wearable glasses although other image capture devices as described above can be used). The user 310 may wish to determine if the unmanned vehicle 300 is where it should be. That is, the user 310 may observe the unmanned vehicle 300 and want to determine if the unmanned vehicle 300 is supposed to be where the user 310 observes the unmanned vehicle 300. Accordingly, the user 310 can use the image capture device 312 to capture a picture that includes the unmanned vehicle 300. The captured image (picture, video, etc.) will be referred to herein as "measured data," i.e., a measurement of the real world as observed by the user 310. The measured data can include various information related to the image that is captured. For example, the measured data can include position data related to the location of the image capture device 312. Further, the measured data can include data related to the location of the unmanned vehicle 300 within the captured image. For example, a measured distance 314 and a measured angle 316 can be calculated from or with the image capture device 312. Based on the location of the image capture device 312, the measured distance 314, and the measured angle 316, the measured data can be used to determine the observed or real-world location of the unmanned vehicle 300. The measured data can be transmitted from the image capture device 312 to a remote resource 318 (such as described above with respect to FIG. 2).

At the remote resource 318, a comparison between the measured data obtained from the image capture device 312 and the prescribed route 302 can be made. Using this comparison, it can be determined if the unmanned vehicle 300 is in an appropriate location or if the unmanned vehicle 300 has deviated from the prescribed route 302. Further, in some embodiments, if a prescribed route was not set or registered for the observed unmanned vehicle 300, the comparison can be used to determine that the unmanned vehicle 300 is unauthorized and located where it should not be. That is, the comparison can be used to determine, for example, if the unmanned vehicle 300 is in violation of the boundary 306, is an unexpected/unauthorized unmanned vehicle, is deviating from the prescribed route 302, or can be used to identify a missing unmanned vehicle (e.g., a status of an unmanned vehicle). Although described as a comparison between the measured data and the prescribed route 302, those of skill in the art will appreciate that the measured data can be compared against an unmanned vehicle database that includes information regarding all registered unmanned vehicles. The unmanned vehicle database can include unmanned vehicle identification information, registration information, registered routing information, ownership and/or operator information, etc.

Figure 4:
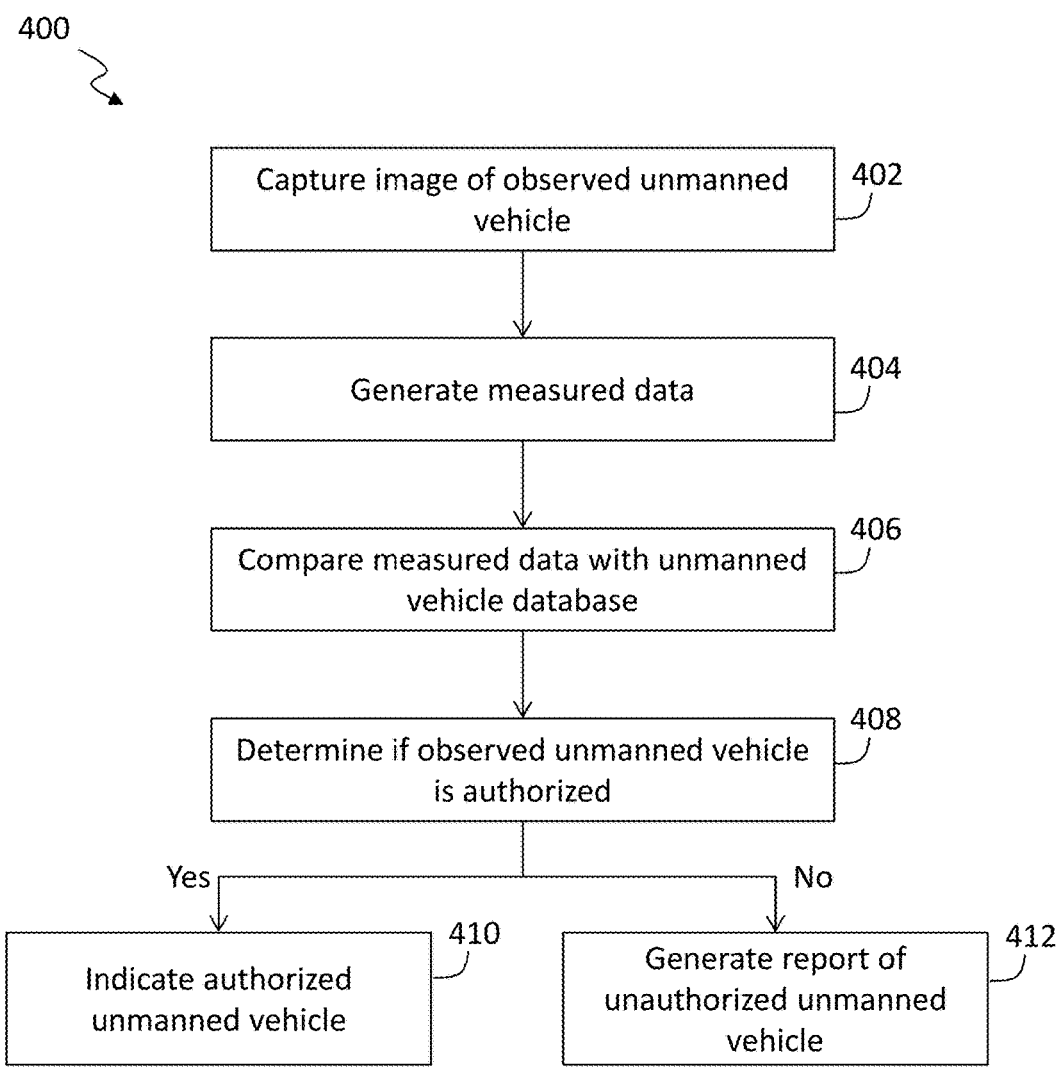
FIG. 4 is a flow process for monitoring and policing unmanned vehicles in accordance with an embodiment.

Turning now to FIG. 4, a flow process 400 in accordance with an embodiment of the present disclosure is shown. The flow process 400 is a process that can be performed by an image capture device that is used by a user that observes an unmanned vehicle. The flow process 400 can, in some embodiments, be performed by different devices and/or various parts of the flow process 400 can be separated and performed by different devices. In other embodiments, the flow process 400 can be performed by a single device, such as an image capture device or smartphone that is operated by the user.

At block 402, an image is captured of an observed unmanned vehicle on the image capture device by a user. The image capture may be prompted by the user observing the observed unmanned vehicle in a location that was not anticipated or expected. Alternatively, a user may wish to determine that the observed unmanned vehicle is on time or traveling along a prescribed route.

At block 404, measured data is generated from the captured image. The measured data may be metadata of the captured image, including time, date, location (e.g., GPS, Wi-Fi, etc.), measured distance to the observed unmanned vehicle from the image capture device, measured angle of the observed unmanned vehicle relative to the image capture device, etc.

At block 406, the measured data is compared with an unmanned vehicle database. The unmanned vehicle database can include various information related to unmanned vehicles, including, but not limited to, unmanned vehicle identification information, registration information, registered routing information, ownership and/or operator information. The comparison can include determining if the measured data matches with any of the information of the unmanned vehicle database to determine if the observed unmanned vehicle is authorized to be where it is observed by the user.

Based on the comparison, at block 408, a determination can be made regarding if the observed unmanned vehicle is authorized or not. The determination can be a simple indication of whether the observed unmanned vehicle is authorized or not (e.g., "yes" or "no"; "authorized" or "unauthorized"; etc.). The determination can output a status of the observed unmanned vehicle (e.g., improper location, improper altitude, etc.)

If it is determined that the observed unmanned vehicle is authorized, (e.g., "yes"), an indication can be provided on the image capture device, at block 410.

However, if it is determined that the observed unmanned vehicle is unauthorized (e.g., "no"), at block 412, a report of an unauthorized unmanned vehicle is generated. The report can include the measured data (Block 404) and the result of the comparison (e.g., Blocks 406, 408). Thus the report can include all pertinent information related to the unauthorized observed unmanned vehicle. The report can then be saved on and/or transmitted from the image capture device. In some embodiments, the report can be transmitted to the unmanned vehicle database for storage. In some embodiments, the report can be transmitted to authorities, e.g., police, so that appropriate action can be taken regarding the unauthorized unmanned vehicle.

Figure 5:
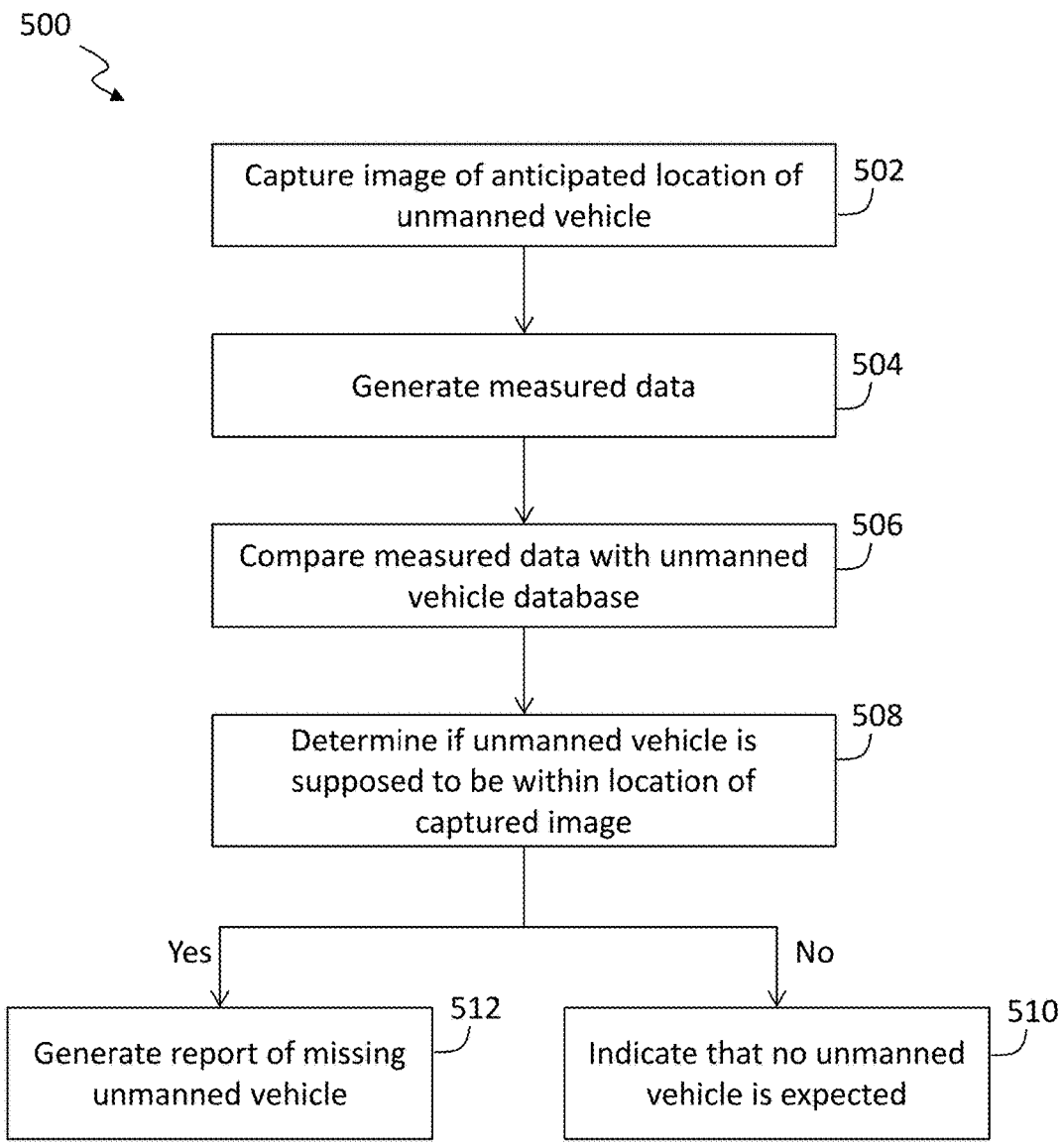
FIG. 5 is another flow process for monitoring and policing unmanned vehicles in accordance with an embodiment.

Turning now to FIG. 5, an alternative embodiment of a flow process in accordance with the present disclosure is shown. In FIG. 5, the flow process 500 can be similar to that described with respect to FIG. 4, but rather than a user observing an unmanned vehicle that they want to know about, in flow process 500, a user is expecting an unmanned vehicle but it has not appeared.

Thus, at block 502, an image can be captured or a location where an unmanned vehicle is expected. At block 504, measured data related to the captured image is generated. At block 506, the measured data is compared with an unmanned vehicle database. From the comparison, at block 508, a determination can be made whether an unmanned vehicle should present in the location of the image/measured data or not. If no unmanned vehicle is supposed to be present at the location ("no"), then, at block 510, an indication that no unmanned vehicle is expected is presented with the image capture device. However, if it is determined at block 508 that an unmanned vehicle is supposed to be present ("yes"), then, at block 512 a report regarding a missing unmanned vehicle will be generated. The report of block 512 can be similar to that described with respect to the report that is generated in the flow process 400 of FIG. 4. In some embodiments, the determination can be a status that an unmanned vehicle is missing.

Those of skill in the art will appreciate that various steps of flow processes 400, 500 can be performed simultaneously, in various orders, and/or on one or more devices. For example, in some embodiments, after the image is captured (blocks 402, 502), the image can be transmitted to a remote resource, and then the processing of blocks 404-412, 504-512 can be performed on the remote resource. Thus, blocks 402, 502 can be replaced with a step of receiving a captured image. In some embodiments, the captured image and measured data can be generated and sent from an image capture device, and then blocks 406-412, 506-512 will be performed on a remote resource. Those of skill in the art will appreciate that other variations or alternatives and/or additional steps and processes can be performed without departing from the scope of the present disclosure.

A non-limiting, example situation that employs embodiments of the present disclosure will now be described. In this example, it is assumed that an unmanned vehicle periodically reports its current location. The reporting can be based on a timing, a location etc. For example, in some configurations, the unmanned vehicle will report its location every one minute. In other configurations, the unmanned vehicle may monitor its location (e.g., based on GPS) and report its location when it reaches designated locations and/or distances. Various other unmanned vehicle location reporting schemes can be used, as known in the art. The reporting can be made to an unmanned vehicle database or other central authority. Thus, any given unmanned vehicle can be tracked and monitored.

Each unmanned vehicle has a unique identity (e.g., ID number, registration number, etc.). The unique identity can be broadcast and/or transmitted with the location reporting information. That is, each location report transmitted by the unmanned vehicle can also include identifying information. Each unmanned vehicle can also receive a prescribed route (e.g., from a central control or database). The prescribed route (e.g., similar to a flight plan) will be stored on the unmanned vehicle database and correlated and/or associated with the unique identity of a respective unmanned vehicle.

Embodiments of the present disclosure enable policing of unmanned vehicles such that users (e.g., observers, citizens, police, authorities, etc.) have the ability to verify an observed (or missing) unmanned vehicle.

For example, if an unmanned vehicle is supposed to be at a location, but it's not there, an investigation can be started about the missing unmanned vehicle. Alternatively, if an unmanned vehicle is observed at a location, but nothing was supposed to be there, the unexpected unmanned vehicle can be reported in an investigation regarding the observed unmanned vehicle can be started. Further, other actions can be taken with respect to an unauthorized unmanned vehicle. For example, authorities can retrieve the unauthorized unmanned vehicle or authorities can track down an owner or operator of the unmanned vehicle and take appropriate action.

As described above, the geographic relationship between an observed unmanned vehicle and a particular location (e.g., a geo-fence) can be visualized in an image capture device (e.g., cell phone camera, eye wearable, etc.). The visualized relationship can be captured as evidence for appropriate authorities (e.g., police) and can be used for taking appropriate action (e.g., issuing a traffic ticket, retrieving, capturing, or destroying the unmanned vehicle, etc.).

As described above, the visualized relationship between the image capture device and the observed unmanned vehicle can be drawn and accomplished by capturing a measured distance from the unmanned vehicle to the image capture device using distance measuring equipment, applications, software, etc. as known in the art. The same or similar equipment, applications, software, etc. can be used to measure or determine a measured angle between the observed unmanned vehicle and the image capture device. The measured data can be used to determine if an observed (or missing) unmanned vehicle is operating unexpectedly (e.g., flying too low or too high, operating beyond a boundary (e.g., inside a geo-fence), etc.). In another embodiment, or in combination therewith, the location of the unmanned vehicle can be based, in part, on a measured location of the observed unmanned vehicle and a relationship of the image capture device with a known boundary or prescribed route.

In another example, real-time monitoring of unmanned vehicles can be achieved by employing embodiments of the present disclosure. For example, an unmanned vehicle's location can be periodically reported to a central authority, as described above. There may be a question regarding the "truth" of the data that is supplied from and reported by the unmanned vehicle (e.g., an illegal operation using an unmanned vehicle). In such an embodiment, users, observers, citizens, police, or other authorities, and/or automated devices (e.g., security cameras) can subscribe to a notification system related to unmanned vehicles. The notifications can be provided by the unmanned vehicle reporting its location to a central system or unmanned vehicle database. The central system can then send out a notification within the area of the reported location to subscribed users. That is, a notification can be sent to users that are within a certain distance to a location where the reporting unmanned vehicle indicates that it is located. Such notification, in some embodiments, can be an alert (e.g., email, text, notification within a mobile application, etc.) or, in the case of automated devices, the notification can be an instruction to capture an image of the location.

That is, once a notification is received, users or automated devices can then look for the unmanned vehicle in the area. In some embodiments, a user can use an image capture device to take an image of the area when a notification arrives. From this, it can be determined if an unmanned vehicle is in proximity to the image capture device or not. If the unmanned vehicle is captured within an image, then no action may be required (i.e., an unmanned vehicle is present where it is expected). However, if a notification arrives and an image is captured and no unmanned vehicle is captured within an image, then a report can be generated. The report can indicate that a specific unmanned vehicle is improperly reporting its position, and thus appropriate authorities can take appropriate action.

Technical effects and benefits include systems and processes for monitoring and policing unmanned vehicles. Further technical effects and benefits include image capturing devices that are used to generate measured data that is compared to known information (e.g., unmanned vehicle database) such that information regarding unmanned vehicles can be obtained, whether it is identification of an unexpected unmanned vehicle, an unmanned vehicle crossing a boundary, determination of a missing unmanned vehicle, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer implemented method for monitoring unmanned aerial vehicles, the method comprising:
   receiving, by a processor, a captured image of an observed unmanned aerial vehicle, the captured image including measured data;
   comparing the measured data with an unmanned aerial vehicle database, wherein the unmanned aerial vehicle database comprises unmanned aerial vehicle identification information and registered routing information;
   determining that a status of the observed unmanned aerial vehicle is authorized or unauthorized based at least in part on the comparison; and
generating a report, which is indicative of the status of the observed unmanned aerial vehicle being authorized or unauthorized, in accordance with the status of the observed unmanned aerial vehicle being determined to be authorized or unauthorized, respectively,
   wherein:
   the measured data comprises a measured distance and a measured angle,
   the method further comprises determining a location of the observed unmanned aerial vehicle from the measured distance and the measured angle,
   the comparing comprises comparing the location of the observed unmanned aerial vehicle with unmanned aerial vehicle identification information and registered routing information of an unmanned aerial vehicle database, and
   the determining of the status of the observed unmanned aerial vehicle as being authorized or unauthorized is based on the location of the observed unmanned aerial vehicle being consistent or inconsistent with the unmanned aerial vehicle identification information and the registered routing information, respectively.

2. The computer implemented method of claim 1, further comprising capturing the captured image of the observed unmanned aerial vehicle with an image capture device.

3. The computer implemented method of claim 1, wherein the unmanned aerial vehicle database further comprises unmanned aerial vehicle registration information, ownership and/or operator information.

4. The computer implemented method of claim 1, wherein the processor is a processor of a smartphone.

5. The computer implemented method of claim 1, wherein the processor is a processor of a security camera.

6. A computer program product for monitoring unmanned aerial vehicles, the computer program product comprising a computer readable storage medium having program instructions embodied therewith, the program instructions executable by a processor to cause the processor to:

receive, by a processor, a captured image of a location where an unmanned aerial vehicle is expected, the captured image including measured data;

compare the measured data with an unmanned aerial vehicle database wherein the unmanned aerial vehicle database comprises unmanned aerial vehicle identification information and registered routing information;

determine if an unmanned aerial vehicle is supposed to be and is within the captured image; and generate an indicator of the unmanned aerial vehicle being authorized based on the determination indicating that the unmanned aerial vehicle should be and is within the captured image or that the unmanned aerial vehicle is unauthorized based on the determination indicating that the unmanned aerial vehicle should be but is not within the captured image or should not be but is within the captured image, wherein:

the measured data comprises a measured distance and a measured angle, the method further comprises determining a location of the observed unmanned aerial vehicle from the measured distance and the measured angle, the comparing comprises comparing the location of the observed unmanned aerial vehicle with unmanned aerial vehicle identification information and registered routing information of an unmanned aerial vehicle database, and the determining of the status of the observed unmanned aerial vehicle as being authorized or unauthorized is based on the location of the observed unmanned aerial vehicle being consistent or inconsistent with the unmanned aerial vehicle identification information and the registered routing information, respectively.

7. The computer program product of claim 6, the program instructions executable by the processor are further configured to cause the processor to capture the captured image of the location with an image capture device.

8. The computer program product of claim 6, wherein the unmanned aerial vehicle database further comprises unmanned aerial vehicle registration information ownership and/or operator information.

9. The computer program product of claim 6, wherein, when the determination is that an unmanned aerial vehicle should be within the captured image, and no unmanned is determined to be within the captured image, the program instructions executable by the processor are further configured to generate a report of a missing unmanned aerial vehicle.

10. The computer program product of claim 6, wherein the processor is a processor of a smartphone.

11. The computer program product of claim 6, wherein the processor is a processor of a security camera.

12. A system to monitor and police unmanned aerial vehicles comprising:

a memory having computer readable instructions; and a processor configured to execute the computer readable instructions, the computer readable instructions comprising:

receiving, by the processor, a captured image of an observed unmanned aerial vehicle, the captured image including measured data;

comparing the measured data with an unmanned aerial vehicle database wherein the unmanned aerial vehicle database comprises unmanned aerial vehicle identification information and registered routing information;

determining that a status of the observed unmanned aerial vehicle is authorized or unauthorized based at least in part on the comparison; and generating a report, which is indicative of the status of the observed unmanned aerial vehicle being authorized or unauthorized, in accordance with the status of the observed unmanned aerial vehicle being determined to be authorized or unauthorized, respectively, wherein:

the measured data comprises a measured distance and a measured angle, the method further comprises determining a location of the observed unmanned aerial vehicle from the measured distance and the measured angle, the comparing comprises comparing the location of the observed unmanned aerial vehicle with unmanned aerial vehicle identification information and registered routing information of an unmanned aerial vehicle database, and the determining of the status of the observed unmanned aerial vehicle as being authorized or unauthorized is based on the location of the observed unmanned aerial vehicle being consistent or inconsistent with the unmanned aerial vehicle identification information and the registered routing information, respectively.

13. The system of claim 12, further comprising an image capture device configured to capture the captured image of the observed unmanned aerial vehicle.

14. The system of claim 12, further comprising a remote resource containing the unmanned aerial vehicle database, wherein the unmanned aerial vehicle database comprises unmanned aerial vehicle identification information, registration information, registered routing information, ownership and/or operator information.

* * * * *